United States Patent Office 3,062,895
Patented Nov. 6, 1962

3,062,895
POLYNUCLEAR POLYPHENOLS
Robert W. Martin, Walnut Creek, and Robert D. Sullivan, Redondo Beach, Calif., assignors to Shell Oil Company, a corporation of Delaware
No Drawing. Filed Sept. 28, 1959, Ser. No. 842,578
1 Claim. (Cl. 260—619)

This invention relates to a new class of phenols and to their preparation. More particularly, the invention relates to new phenols having two alkylated phenolic benzyl radicals separated by a tetraalkyl phenylene radical.

Natural and synthetic organic polymers such as natural rubber, cis-1,4-polyisoprene, polybutadiene, polyethylene and polypropylene, undergo degradation when exposed to sunlight, heat and atmospheric oxygen. Although efforts have been made to suppress this degradation in the polymers by incorporation therein of conventional stabilizers, such efforts have not been completely successful. One reason for their partial failure has been the necessity of compounding the stabilizers with the polymers at relatively high handling temperatures, such as on Banbury mills, in rolls and the like. At the elevated temperatures required for this type of handling, the anti-oxidants employed are so volatile that they distill from the mixture during processing.

Furthermore, the molding and forming of finished products from these polymers involves their subsequent exposure to high temperature. Even stabilizers remaining in the polymer from the compounding stage tend to be removed from the composition during forming, so that the finished plastic product is rendered more susceptible to oxidative deterioration. Moreover, the high temperatures experienced by the plastic during processing cause an undesirable reduction in the molecular weight or intrinsic viscosity of the polymer.

In elastomers the deterioration takes the form of cracking, tearing and hardening, while in other polymeric materials, such as polyethylene or polypropylene, degradation is manifested by checking and embrittlement of the resinous product. This is particularly true of olefins polymerized by low pressure processes, such as those catalyzed by the metallo-organic "Ziegler" catalysts, described in U.S. Patents 2,827,447 and 2,832,759. The reasons for low pressure polymers being unusually susceptible to thermal, oxidative and ultraviolet light degradation has not been definitely established. However, one of the reasons proposed is the catalysis of the degradation by metal residues left by the catalysts in the polymers.

To combat this degradation, the use of a variety of stabilizers has been suggested. No single chemical compound has, however, afforded protection against oxidative, thermal and ultraviolet attack. For example, conventional mononuclear alkylated phenols, while affording some protection against oxidative deterioration, are too volatile to be useful during high temperature processing.

It has therefore been necessary to include in the polymer a particular stabilizer for each of the sources of deterioration. As a consequence, olefinic polymers prepared by low pressure methods are currently formulated and marketed with as many as three to five different stabilizers, each having only a single stabilizing activity. The use of a plurality of stabilizers is both expensive and not entirely satisfactory, since a high degree of product stability has not been achieved even with their inclusion.

It has now been found that members of a single class of polynuclear polyphenols can, when incorporated in organic materials, normally subject to oxidative deterioration, such as fats, oils, gasoline, lubricants and plastics, stabilize these materials against all of the noted sources of degradation. It is an object of this invention to provide novel polynuclear polyphenols useful as stabilizers and a process for their preparation. A further object of the invention is the provision of a new class of polyhydric polynuclear phenols which are particularly effective in preventing hardening, discoloration and loss of physical properties of natural and synthetic rubbers on exposure to light, heat and oxygen. Still a further object of the invention is the provision of a class of non-volatile polynuclear polyphenols effective to stabilize polyolefins against embrittlement and other forms of environmental attack. Polynuclear polyphenols capable of stabilizing low pressure polymers containing metallic catalyst residues under conditions of processing and use are yet another object of the invention. The preparation of such polyhydric polynuclear phenols is another object of the invention. Other objects and advantages of the invention will be apparent from the following detailed description thereof.

These and other objects are accomplished in the invention by novel 1,4-bis(3,5-dialkyl-hydroxybenzyl)tetraalkyl benzene, wherein each of the alkyl substituents has up to 8 carbon atoms. Such compounds include both the 1,4-bis(3,5-dialkyl-4-hydroxybenzyl) tetraalkyl benzene, represented by the structure

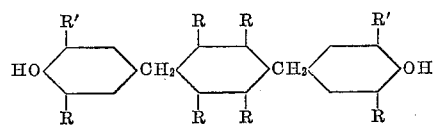

wherein each R and R' is an alkyl radical, preferably having up to 8 carbon atoms; and the 1,4-bis(3,5-dialkyl-2-hydroxybenzyl)tetraalkyl benzene represented by the structure

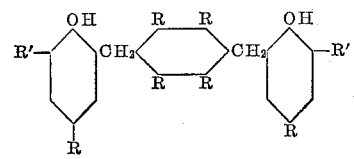

wherein R and R' have the significance noted above. These particular polynuclear polyhydric phenols have been found to possess, because of their unique structural characteristics, superior properties as inhibitors in organic materials normally subject to oxidative deterioration, particularly those exposed to elevated temperatures. Not only are they non-migratory, non-discoloring and non-staining but they are exceptionally compatible and non-volatile under conditions of use.

Exemplary of the compounds of the noted class are 1,4-bis(3,5-dimethyl-4-hydroxybenzyl)tetramethyl benzene; 1,4-bis(3-methyl-5-ethyl-4-hydroxybenzyl)tetraethyl benzene; 1,4-bis(3,5-diisopropyl-4-hydroxybenzyl)tetramethyl benzene; 1,4-bis(3-methyl-5-tert-butyl-4-hydroxybenzyl)tetramethyl benzene; 1,4-bis(3,5-dihexyl-4-hydroxybenzyl)tetrapropyl benzene; 1,4-bis(3-tert-amyl-5-heptyl-4-hydroxybenzyl)tetrabutyl benzene; and 1,4-bis-(3,5-dioctyl-4-hydroxybenzyl)tetrapentyl benzene, as well as their 1,4-bis(3,5-dialkyl-2-hydroxybenzyl)tetraalkyl benzene isomers. These compounds may best be envisaged by the following detailed discussion of their preparation.

The polynuclear phenols of the invention are prepared by reacting together in liquid phase at a temperature in excess of about 50° C. a dialkyl phenol wherein two of the three ring carbon atoms ortho and para to the hydroxyl group are each substituted with an alkyl radical, preferably having up to 8 carbon atoms, and the third ring carbon atom has a replaceable hydrogen atom, and 1,4-bis(halomethyl)tetraalkyl benzene, wherein each of the alkyl radicals has up to 8 carbon atoms.

Dialkyl phenols employed as reactants in the process are those mononuclear monohydroxy benzenes selected from the group consisting of 2,6-dialkyl phenol and 2,4-dialkyl phenol. These phenols have the general formula

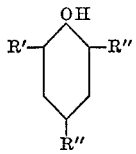

wherein R' is an alkyl radical, preferably having up to 8 carbon atoms, and each R'' is selected from the group consisting of alkyl radicals and the hydrogen atom, where one R'' on the ring is an alkyl group, preferably having up to 8 carbon atoms, and the other R'' on the ring is a replaceable hydrogen atom. Representative dialkyl phenols are 2,6-dimethyl phenol, 2,6-diethyl phenol, 2-methyl-6-ethyl phenol, 2,6-dibutyl phenol, 2,6-diheptyl phenol, 2-pentyl-6-octyl phenol, and their 2,4-dialkyl isomers. Preferred members of the dialkyl phenol reactant are those wherein an alkyl radical ortho to the hydroxyl radical is branched on the alpha carbon atom, thus partially hindering the hydroxyl radical. Typical of such dialkyl phenols are 2-isopropyl-4-methyl phenol, 2-sec-butyl-6-methyl phenol, 2-tert-butyl-4-methyl phenol, 2-tert-amyl-6-hexyl phenol, 2-tert-octyl-6-butyl phenol, and the like.

Most preferred phenols are those 2,6-dialkyl phenols having both alkyl radicals branched on the alpha carbon atom, thus affording the most obstruction to the hydroxyl group and rendering the product polynuclear polyphenol the best antioxidant. Such phenols are exemplified by those phenols having secondary alkyl substituents, including 2,6-diisopropyl phenol, 2,6-di-sec-butyl phenol, 2-isopropyl-6-sec-butyl phenol and 2,6-di-sec-heptyl phenol; those phenols having both secondary and tertiary alkyl substituents, such as 2-isopropyl-6-tert-butyl phenol and 2-sec-butyl-6-tert-amyl phenol, and those phenols wherein both alkyl substituents are tertiary, such as 2,6-di-tert-butyl phenol, 2-tert-butyl-6-tert-amyl phenol, 2,6-di-tert-hexyl phenol and 2-tert-heptyl-6-tert-octyl phenol.

The dialkyl phenols described are reacted in the process of the invention with 1,4-bis(halomethyl)tetraalkyl benzene in liquid phase and at elevated temperature to produce the novel polynuclear polyphenolic products. The halomethyl tetraalkyl benzenes have the general formula

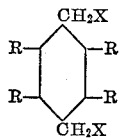

wherein each R is an alkyl radical, preferably having up to 8 carbon atoms, and each X is a halogen atom, preferably selected from chlorine and bromine. These compounds include 1,4-bis(halomethyl)tetraalkyl benzenes wherein all of the alkyl radicals are the same, such as 1,4-bis(chloromethyl)-2,3,5,6-tetramethyl benzene; 1,4-bis(bromomethyl)tetraethyl benzene; and 1,4-bis(chloromethyl)-2,3,5,6-tetraoctyl benzene; or the R's may be different alkyl radicals. The preferred reactant is 1,4-bis(chloromethyl)tetramethyl benzene, prepared by reacting tetramethyl benzene with formaldehyde and hydrogen chloride.

Proportions of reactants employed should be at least stoichiometric, that is, at least two moles of the dialkyl phenol per mole of the 1,4-bis(halomethyl)tetraalkyl benzene. However, since the phenols employed as reactants are also good diluents, it is convenient to employ somewhat greater phenol/benzene ratio, and molar ratios of dialkyl phenol to the bis(halomethyl)tetraalkyl benzene of from 3/1 to 5/1 have been found to give excellent results.

The reaction between the dialkyl phenol and the 1,4-bis-(halomethyl)tetraalkyl benzene is conveniently conducted by heating the two reactants together in liquid phase. The reaction between them is quite slow, but increases with increasing temperature. The temperature employed may be between the range of about 50° C. to about 300° C.; above that temperature, decomposition of the reactants becomes rapid. Preferred temperatures, at which the reaction occurs at a reasonable rate without a prohibitive amount of decomposition, are from about 50°–150° C. Subatmospheric or superatmospheric pressures may be employed, although the reaction proceeds suitably at normal atmospheric pressure.

The reaction may be conducted in the presence or absence of solvents or diluents. If solvents or diluents are employed, preferred materials are polyhalogenated hydrocarbons, such as tetrachloroethane, hexachloropropane, dichloro- and trichlorobenzene and carbon tetrachloride. These liquids have excellent inertness and stability over the temperature range and conditions employed in the process of the invention. Such hydrocarbons as benzene, toluene and xylene may also be employed.

While the alkylation reaction will proceed by merely heating together the dialkyl phenol and the 1,4-bis(halomethyl)tetraalkyl benzene, for a more rapid reaction the use of an alkylation catalyst has been found to be helpful. Catalysts which give the best results are non-volatile acidic catalysts, including such acids as p-toluenesulfonic acid, phosphoric acid and sulfuric acid, and the like. Particularly preferred catalysts for the reaction are Friedel-Crafts catalysts such as $AlCl_3$, $ZnCl_2$ and $BF_3$. Amounts of catalyst from about 0.1% by weight, based on the tetraalkyl benzene, to about 3% are most effective.

The alkylation may be readily followed by the evolution of the hydrogen chloride produced. When it is desired to terminate the reaction, the reaction mixture may be readily cooled and the product polynuclear polyphenol separated by such conventional methods as filtration, centrifugation, crystallization, solvent extraction, and the like. Upon purification, the polynuclear polyphenols are semi-solids to solids which generally appear as white crystalline materials. They are readily compatible with organic materials, particularly hydrocarbons.

Alternatively, the polynuclear phenols of the invention may be prepared by reacting the dialkyl phenols described with 1,4-bis-(hydroxymethyl)tetraalkyl benzene, under the conditions described. The latter class of reactants has the structure

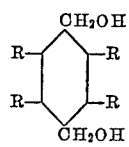

wherein each R is an alkyl radical, preferably having up to 8 carbon atoms. As in the case of the 1,4-bis(halomethyl)tetraalkyl benzene reactants already noted, the alkyl ring substituents may be the same or they may be different. Typical of these compounds are 1,4-bis(hydroxymethyl)tetraethyl benzene; 1,4-bis(hydroxymethyl)tetraheptyl benzene; and 1,4-bis(hydroxymethyl)-2,6-dimethyl-3,5-dibutylbenzene. Preferred reactant because of its availability and reactivity is 1,4-bis(hydroxymethyl)tetramethylbenzene. In general, these compounds are readily prepared by hydrolyzing the 1,4-bis(halomethyl)tetraalkyl benzenes already described.

This class of reactants has the advantage that, when reacted with dialkyl phenol, water is one of the products rather than the hydrogen halides produced when the halomethyl benzene reactants are employed. As a consequence, the hot reaction mixture containing the bis(hydroxymethyl) reactants is much less acidic, and less dealkylation of reactants and product takes place.

The reaction of the invention may also be conducted by employing in place of the 1,4-bis(halomethyl)tetraalkyl benzenes their 1,4-bis(acetoxymethyl)tetraalkyl benzene derivatives. These derivatives are prepared by reacting the halomethyl compounds with a metal salt of acetic acid, e.g., silver acetate or sodium acetate. The resulting acetoxymethyl compounds have the structure

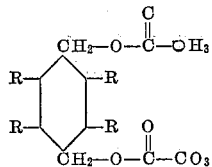

wherein each R is an alkyl radical, preferably having up to 8 carbon atoms. Representative of these compounds are 1,4-bis(acetoxymethyl)tetrabutyl benzene; 1,4-bis(acetoxymethyl)tetrapentyl benzene; and 1,4-bis(acetoxymethyl)-2-isobutyl-3,5,6-tripropyl benzene. The preferred reactant is 1,4-bis(acetoxymethyl)tetramethyl benzene.

It will thus be seen that the tetraalkyl benzene reactants of the invention are those selected from 2,3,5,6-tetraalkyl benzenes wherein the 1 and 4 ring carbon atoms are each substituted with a radical selected from the group consisting of halomethyl, hydroxymethyl and acetoxymethyl radicals. While both the 1 and 4 carbon atoms are preferably substituted with the same radical, mixed derivatives of the 1,4-bis(halomethyl)tetraalkyl benzenes may be prepared wherein the 1 and 4 carbon atoms have different radicals, and such derivatives are operative under the conditions described.

In particular, the 1,4-bis(3,5-dialkyl-hydroxybenzyl) tetraalkyl benzenes of the invention are useful as the sole stabilizer for protecting polyolefins against thermal, oxidative and ultraviolet degradation. The stabilizer may be incorporated in the polyolefin by such conventional means as milling or Banburying. Alternatively, the stabilizer may be dissolved in a solvent, such as one of the chlorinated hydrocarbons described above, and the resulting solution mixed with the polymer. The solvent may then be separated from the polymer by evaporation. Suitable polymers with which the compounds may be employed include such polymerized alpha-olefins as polyethylene, polypropylene, butene-1, pentene-1, and the like.

In like manner, the compounds of the invention may be incorporated with such elastomers as natural rubber and synthetic rubbers, including polybutadiene, polyisoprene, chloroprene and its copolymers, butadiene-styrene copolymers, polyisobutylene, and butadiene-acrylonitrile rubbers. The 1,4-bis(3,4-dialkyl-hydroxybenzyl)tetraalkyl benzene may be incorporated in the finished rubber by milling, or it may be added to the latex prior to or during coagulation thereof.

Other substrates to which the compounds of the invention afford superior protection include hydrocarbons, such as gasoline and fuel and lubricating oils, greases, edible oils such as vegetable oils and lard, and the like. In most mases, amounts of the 1,4-bis(3,5-dialkyl-monohydroxybenzyl)tetraalkyl benzene required to stabilize such normally oxidizable materials range from 0.0001% by weight to about 5%.

To illustrate further the novel products and processes of this invention, the following specific examples are set forth. It should be understood, however, that these examples are merely illustrative and are not to be regarded as limitations to the appended claims, since the basic teachings thereof may be varied at will as will be understood by one skilled in the art. In the examples, the proportions are expressed in parts by weight unless otherwise noted.

EXAMPLE I

This example illustrates the preparation of 1,4-bis(2-hydroxy-3-tert-butyl-5-methylbenzyl)tetramethyl benzene.

Fifty parts of o-tert-butyl-p-cresol, 23.1 parts of 1,4-bis(chloromethyl)tetramethyl benzene and 100 parts of tetrachloroethane were placed in a reaction flask attached to an air-cooled condenser and the mixture heated to boiling for about one hour. The reaction mixture was then poured into an open container and cooled. Crystals began to separate almost immediately. The precipitate was collected, dried and then recrystallized. The white crystalline product having a melting point of 295° to 300° C. was identified as 1,4-bis(2-hydroxy-3-tert-butyl-5-methylbenzyl)tetramethylbenzene.

| | C, percent | H, percent | Acidity, eq./100 g. | Molecular weight |
|---|---|---|---|---|
| Found | 84 | 9.1 | .41 | 486 |
| Calculated | 84.1 | 9.4 | .412 | 486 |

EXAMPLE II

This example illustrates the preparation of 1,4-bis(2-hydroxy-3,5-dimethylbenzyl)tetramethyl benzene.

Thirty-six and six-tenths parts of 2,4-xylenol and 23.1 parts of 1,4-bis(chloromethyl)tetramethyl benzene were placed in a reaction flask equipped with an air-cooled condenser. The mixture was heated to melt the components. The temperature was then slowly raised to 200°–210° C. and held at that point for 30 minutes. The product was dissolved in 1:1 methyl ethyl ketone and toluene, and the solution allowed to cool. The white crystals that collected (70% yield) had a melting point of 258° C. and were identified as 1,4-bis(2-hydroxy-3,5-dimethylbenzyl)tetramethyl benzene.

| | C, percent | H, percent | Acidity eq./100 g. |
|---|---|---|---|
| Found | 83.5 | 8.5 | .50 |
| Calculated | 83.5 | 8.47 | .498 |

EXAMPLE III

This example illustrates the preparation of 1,4-bis(2-hydroxy-3-tert-butyl-5-ethylbenzyl)tetramethyl benzene.

Five hundred forty parts of 2-tert-butyl-4-ethyl phenol, 230 parts of 1,4-bis(chloromethyl)tetramethyl benzene and 100 parts of tetrachloroethane are placed in a reaction flask attached to an air condenser and the mixture heated to boiling for about one hour. The reaction mixture is then poured into an open container and cooled. The white crystals that separated are dried and then recrystallized. The product is identified as 1,4-bis(2-hydroxy-3-tert-butyl-5-ethylbenzyl)tetramethyl benzene.

EXAMPLE IV 1,4 - bis(2 - hydroxy-3-octyl-5-ethylbenzyl)tetramethyl benzene is produced by the method shown in the preceding example wherein the 2-tert-butyl-4-ethyl phenol is replaced by an equivalent amount of 2-octyl-4-ethyl phenol. The resulting product is a white crystalline high-melting solid.

EXAMPLE V

To a flask equipped with condenser was added 25 parts of 2,4-xylenol, 17 parts of 1,4-bis(hydroxymethyl)tetramethyl benzene, 0.3 part of p-toluenesulfonic acid and 25 parts of tetrachloroethane.

The reaction mixture was heated to boiling and the water formed in the reaction was taken off. The mixture was refluxed for a half hour, during which time an additional 25 parts of tetrachloroethane was added to replace that distilled off.

The mixture was then cooled and the product solids recrystallized from toluene, yielding 32.1 parts of a crystalline solid melting at 258–260° C. Analysis showed this product to be 1,4-bis(2-hydroxy-3,5-dimethylbenzyl)tetramethyl benzene.

EXAMPLE VI

A reaction flask was fitted with a Claisen head and a condenser, and to it was added 10.6 parts of 1,4-bis(acetoxymethyl)tetramethyl benzene, 10.8 parts of 2,4-xylenol and 25 parts of tetrachloroethane.

The mixture was slowly distilled until no more liquid remained in the flask. The resulting brown residue was recrystallized from toluene to yield 13.7 parts of a snow-white crystalline product having a melting point of 258–260° C. Analysis showed it to be 1,4-bis(2-hydroxy-3,5-dimethylbenzyl)tetramethyl benzene.

EXAMPLE VII

This example illustrates the preparation of 1,4-bis(3,5-di-tert-butyl-4-hydroxybenzyl)tetramethyl benzene.

To a 500-ml. reaction vessel provided with a stirrer, thermometer, gas inlet tube and condenser was added 46.2 parts 1,4-bis(chloromethyl)tetramethyl benzene, 86.4 parts of 2,6-di-tert-butyl-phenol, 200 parts of benzene and 0.05 part of zinc chloride. The mixture was heated while bubbling nitrogen through it, and was maintained for about 38 hours at temperatures between 50° and about 75° C. From time to time fresh benzene was added to maintain the mixture at constant volume. When no further hydrogen chloride was evolved, the mixture was cooled and poured into an excess of isopropyl alcohol.

A white crystalline material precipitated from the resulting mixture and was filtered off. In this way, a product having the following analysis was recovered:

|  | Phenolic hydroxyl, eq./100 g. | C, percent weight | H, percent weight | Mol. weight |
|---|---|---|---|---|
| Calculated | 0.350 | 84 | 10.2 | 570 |
| Found | 0.351 | 83.8 | 10.1 | 557 |

This material was determined to be 1,4-bis(3,5-di-tert-butyl-4-hydroxy-benzyl)tetramethyl benzene.

EXAMPLE VIII

Several of the stabilizers prepared by the methods indicated in the prior examples were mixed with polypropylene and sheets thereof formed. The results are tabulated in Table I and in all cases the unstabilized polypropylene had an initial intrinsic viscosity of 6.4 dl./g., a titanium content of 170 p.p.m., aluminum content of 69 p.p.m., total ash of 0.06% by weight, and a crystalline content of 92.4%. The titanium and aluminum are residues of the catalyst employed for the preparation of the polypropylene, namely, the reaction product of titanium trichloride and aluminum triethyl in the mole ratio of 3:1. In Table I the natural weathering test indicates the number of days for complete embrittlement to take place with a sample exposure to outdoor weathering. The "133° C., oven" test involves placing a sample of polypropylene film in an air-circulating oven maintained at 133° C. and determining the number of hours before complete embrittlement takes place.

From the natural weathering conditions of the exposed polypropylene films, it will be observed that they exhibit very high stability against ultraviolet light degradation and degradation due to atmospheric oxygen. From the 133° C. oven test it will be seen that the films have high stability to degradation caused by heat. In addition to the above, the compositions will be found to have improved stability to molecular weight degradation during processing as is shown from a typical example wherein a sample of the polypropylene powder (I.V. 6.4) was heated for 15 minutes at 290° C. When the powder was not protected, the I.V. measured in decalin at 150° C., after heating, was 0.40 dl./g. whereas when 0.5% of the stabilizer 1,4-bis(3,5-di-tert-butyl-4-hydroxybenzyl)tetramethyl benzene was added to the powder, prior to heating, the I.V. after heating for the same period was 2.05 dl./g.

Table I

| Stabilizer | Conc. parts by weight | Natural weatherings, days | 133° C. oven hrs. |
|---|---|---|---|
| None | | <10 | 6 |
| 1,4-bis(3,5-di-t-butyl-4-hydroxybenzyl) tetramethyl benzene. | 0.25 | 23 | 45 |
| | 0.50 | 65 | 257 |
| | 0.75 | 58 | 342 |
| | 1.0 | 58 | 417 |
| 1,4-bis(3-t-butyl-5-ethyl-2-hydroxybenzyl)tetramethyl benzene. | 0.5 | 37 | 250 |
| | 0.75 | 37 | 297 |
| | 1.0 | 37 | 400–435 |
| 1,4-bis(3-t-butyl-5-methyl-2-hydroxybenzyl)tetramethyl benzene. | 0.5 | | 142 |

EXAMPLE IX

In the following experiment, the stability of samples of polyethylene containing various stabilizers, upon milling at high temperature, was determined.

Samples of a commercial polyethylene resin, Du Pont's Alathon, were milled for extended periods at 160° C. Each sample was a 300-gram batch milled on a 6" two-roll 1:1.4 differential speed mill. All physical tests were made on film of 0.010–0.015 inch thickness pressed from the samples, except the color observations, which were made on 0.075-inch thick specimens, and the electrical tests, made on molded discs 2" x 0.075".

The Akroflex CO antioxidant is a commercial aryl amine type composition consisting of a mixture of 65% phenyl-beta-naphthylamine and 35% diphenyl-p-phenylenediamine.

Results of the tests are shown in Table II.

Table II
EFFECT OF PROLONGED MILLING OF POLYETHYLENE CONTAINING VARIOUS ANTIOXIDANTS

| Milling time at 160° C. | Properties | Control (no antioxidant) | 0.05% 2,6-di-t-butyl-4-methyl phenol | 0.05% Akroflex CO | 0.05% 1,4-bis (2-hydroxy-3-t-butyl-5-methylbenzyl) tetramethyl benzene |
|---|---|---|---|---|---|
| 5 min. | Power factor at 80 mc/sec. | 0.0002 | 0.0003 | 0.0002 | 0.0001 |
| 1½ hr. | | 0.0021 | 0.0010 | 0.0002 | 0.0003 |
| 3 hr. | | 0.0044 | 0.0037 | 0.0001 | 0.0003 |
| 5 min. | Tensile strength, p.s.i. | 2,100 | 1,820 | 1,710 | 1,830 |
| 3 hr. | | 1,200 | 1,240 | 2,100 | 1,610 |
| 5 min. | Modulus at 300% elongation, p.s.i. | 1,500 | 1,560 | 1,260 | 1,180 |
| 3 hr. | | | | 1,250 | 1,300 |
| 5 min. | Ultimate elongation, percent | 440 | 460 | 530 | 510 |
| 3 hr. | | 75 | 75 | 550 | 420 |
| 5 min. | Yield Point, p.s.i. | 1,100 | 1,010 | 1,000 | 920 |
| 3 hr. | | 1,020 | 1,110 | 1,030 | 930 |
| 5 min. | Maximum temperature at which stock can be worked on mill, °C. | >150 | >150 | >150 | >150 |
| 3 hr. | | <100 | 105 | >150 | >150 |
| 5 min. | Color | White | White | Lt. brown | White |
| 1½ hr. | | White | White | Lt. brown | Lt. tan |
| 3 hr. | | White | White | Brown | Lt. brown |

It will be seen that the compound 1,4-bis(2-hydroxy-3-t-butyl-5-methylbenzyl)tetramethyl benzene gave excellent protection, as evidenced by the slow rise in power factor and the excellent retention of physical properties in the samples containing it.

EXAMPLE X

Stabilization of rubber by the compounds of the invention against degradation by aging is demonstrated in the following experiment.

A series of rubber stocks were prepared by milling samples having the following rubber recipe with various amounts of 1,4-bis(2-hydroxy-3-tert-butyl-5-methylbenzyl)tetramethyl benzene, and vulcanizing the samples by heating to 145° C. for 45 minutes:

| | Parts |
|---|---|
| Pale crepe rubber | 100 |
| Stearic acid | 1.0 |
| Calcium carbonate | 35.0 |
| Titanium dioxide | 15.0 |
| Zinc oxide | 5.0 |
| Benzothiazyldisulfide | 1.0 |
| Sulfur | 3.0 |

Samples of the vulcanizates were then placed in an oxygen bomb for periods of 36 and 168 hours at 70° C. and 300 p.s.i.g. The tensile strengths of the resulting samples and an unstabilized control were then measured. Data resulting from these measurements are presented in Table III.

Samples having the above recipe and containing 1 part of the 1,4-bis(2-hydroxy-3-tert-butyl-5-methylbenzyl) tetramethyl benzene were vulcanized as above and placed in a Weatherometer. Colors of the samples after 0 cycles, 1 cycle (17 hours) and 2 cycles are compared in Table IV with those of an unstabilized sample and with those of a sample stabilized with a commercial stabilizer, American Cyanamid's 2246 (bis(2-hydroxy-3-tert-butyl-5-methylphenyl)methane). In these measurements, the color of the rubber specimen was measured by comparing the amount of light reflected from the surface of the sample to that of incident blue light. The decrease in percent reflectance with time indicates an increase in the color of the rubber, chiefly in the yellow region.

*Table IV*

| Antioxidant | Percent reflectance | | |
|---|---|---|---|
| | 0 cycle | 1 cycle | 2 cycles |
| None | 56.2 | 39.9 | 33 |
| Antioxidant 2246 | 59.3 | 36.1 | 27.0 |
| 1,4-bis(2-hydroxy-3-t-butyl-5-methylbenzyl) tetramethyl benzene | 58.0 | 44.6 | 34.9 |

It will be noted that while the decrease in reflectance of the rubber stabilized with Antioxidant 2246 was 54%, the decrease in the sample stabilized with the polynuclear polyphenol was only 40%.

EXAMPLE XI

To samples of rubber having the recipe of that in Example X were added various amounts of the compound 1,4-bis(2-hydroxy-3,5-dimethylbenzyl) benzene. The samples were vulcanized as in the previous example and placed in an oxygen bomb at 70° C. and 300 p.s.i.g. for periods of 72 and 168 hours. At the end of that time the tensil strengths of the samples were determined. The tensile strengths of the samples so tested are presented in Table V together with similar data from unstabilized samples.

*Table III*

| | Control | | Sample containing 1,4-bis(3-tert-butyl-5-methyl-2-hydroxybenzyl) tetramethyl benzene | | | | | |
|---|---|---|---|---|---|---|---|---|
| Concen. per 100 parts rubber | | | 0.5 | | 1.0 | | 1.5 | |
| TEST DATA ON VULCANIZATE | | | | | | | | |
| Cure: | | | | | | | | |
| Min at 145 | 20 | 30 | 20 | 30 | 20 | 30 | 20 | 30 |
| Original tensile strength | 3,340 | 3,100 | 3,520 | 3,000 | 3,420 | 3,100 | 3,400 | 3,100 |
| Aged 72 hours: | | | | | | | | |
| Tensile strength | 2,060 | 660 | 3,010 | 2,110 | 2,640 | 1,720 | 2,340 | 1,900 |
| Tensile retained in % | 61.7 | 21.3 | 85.5 | 70.4 | 77.2 | 55.5 | 68.8 | 61.3 |
| Aged 168 hours: | | | | | | | | |
| Tensile strength | Melted | Melted | 1,960 | 1,130 | 1,620 | 590 | 1,830 | 1,200 |
| Tensile retained in % | None | None | 55.6 | 37.7 | 47.4 | 19.0 | 53.8 | 38.7 |

*Table V*

| | Control | | Sample containing 1,4-bis(2-hydroxy-3,5-dimethylbenzyl) tetramethyl benzene | | | | | |
|---|---|---|---|---|---|---|---|---|
| Concen. per 100 parts rubber | | | 0.5 | | 1.0 | | 1.5 | |
| TEST DATA ON VULCANIZATE | | | | | | | | |
| Cure, min. at 145 | 20 | 30 | 20 | 30 | 20 | 30 | 20 | 30 |
| Original tensile sterngth | 3,340 | 3,100 | 3,370 | 3,120 | 3,240 | 3,280 | 3,260 | 3,000 |
| Aged 72 hr.: | | | | | | | | |
| Tensile strength | 2,060 | 600 | 2,620 | 1,920 | 2,800 | 2,000 | 2,620 | 1,640 |
| Tensile strength retained, percent | 61.7 | 21.3 | 77.8 | 61.5 | 86.5 | 61.0 | 80.4 | 54.7 |
| Aged 168 hr.: | | | | | | | | |
| Tensile strength | Melted | Melted | 1,710 | 900 | 1,700 | 600 | 1,580 | 650 |
| Tensile strength retained, percent | None | None | 50.7 | 28.8 | 52.5 | 18.3 | 48.5 | 21.7 |

Samples of the noted rubber containing one part of the polynuclear polyphenol were compared with samples of the rubber containing one part of Antioxidant 2246 in a Weatherometer, as in the previous example. The data resulting from these measurements are presented in Table VI.

Table VI

| Antioxidant | Percent reflectance | | |
|---|---|---|---|
| | 0 cycle | 1 cycle | 2 cycles |
| None | 56.2 | 39.9 | 33.5 |
| Antioxidant 2246 | 59.3 | 36.1 | 27.0 |
| 1,4-bis(2-hydroxy-3,5-dimethylbenzyl) tetramethyl benzene | 58.9 | 47.2 | 37.7 |

It will be seen that the reflectance of the sample containing Antioxidant 2246 decreased by 54.5%, while that containing the polynuclear polyphenol decreased by only 35.5%.

EXAMPLE XII

A sample of a commercial Wilmington gasoline consisting primarily of a mixture of about 10% butane, about 30% straight run gasoline, about 20% sweetened thermal and catalytically cracked light pentanes, about 20% thermally cracked gasoline, and the remainder of hydrogenated catalytically cracked gasoline was thoroughly washed to remove natural and added inhibitors. To small equal portions of this sample were added small amounts of the stabilizers noted below in concentrations of 10 mg./dl., and the induction periods for the stabilizers determined.

The determination was made by sealing the portions of gasoline containing the stabilizer in a bomb provided with pressure recording means, pressuring the bomb to 100 p.s.i.g. with gaseous oxygen, and immersing the bomb in a boiling water bath. The induction periods tabulated are the times which elapsed between immersion and the time at which each sample began to absorb oxygen at a rate exceeding 2 p.s.i.g. in 15 minutes. Table VII lists the antioxidants tested and their induction periods in comparison with the inhibitor period for washed, uninhibited gasoline.

Table VII

| Stabilizer | Induction period, hr. |
|---|---|
| None | 1.33 |
| 2,2',6,6'-tetra-t-butyl biphenol | 4.29 |
| 2,6-di-t-butyl phenol | 5.85 |
| 2,4,6-tri-t-butyl phenol | 7.15 |
| 1,4-bis(3,5-di-t-butyl-4-hydroxybenzyl)tetramethyl benzene | 7.32 |
| Bis(3,5-di-t-butyl-4-hydroxyphenyl)methane | 8.33 |

It will be seen from these data that the polynuclear polyphenol materially stabilized the gasoline to a degree almost comparable to that of the bisphenol, a commercial antioxidant.

We claim as our invention:

1,4-bis(3,5-di-tert-butyl-4-hydroxybenzyl)tetramethyl benzene.

References Cited in the file of this patent

UNITED STATES PATENTS

| | | |
|---|---|---|
| 1,880,566 | Weiler et al. | Oct. 4, 1932 |
| 2,321,627 | Rothrock | June 15, 1943 |
| 2,634,297 | Moyle | Apr. 7, 1953 |
| 2,807,653 | Filbey et al. | Sept. 24, 1957 |
| 2,877,209 | Jansen et al. | Mar. 10, 1959 |
| 2,883,365 | Mathes | Apr. 21, 1959 |
| 2,914,540 | Goddu et al. | Nov. 24, 1959 |

FOREIGN PATENTS

| | | |
|---|---|---|
| 568,104 | Belgium | June 14, 1958 |
| 205,495 | Austria | Sept. 25, 1959 |

OTHER REFERENCES

Nauta et al.: Rec. Trav. Chim., vol. 55 (1956), 1000–1006 (7 pages).